(12) United States Patent
Hall et al.

(10) Patent No.: US 10,328,939 B2
(45) Date of Patent: Jun. 25, 2019

(54) BIG AIR ELECTRONIC CONTROL MODULE

(71) Applicants: David R. Hall, Provo, UT (US);
Stephen R. Hall, Draper, UT (US)

(72) Inventors: David R. Hall, Provo, UT (US);
Stephen R. Hall, Draper, UT (US)

(73) Assignee: Hall Labs LLC, Provo, UT (US)

( * ) Notice: Subject to any disclaimer, the term of this patent is extended or adjusted under 35 U.S.C. 154(b) by 232 days.

(21) Appl. No.: 15/491,156

(22) Filed: Apr. 19, 2017

(65) Prior Publication Data
US 2018/0304893 A1   Oct. 25, 2018

(51) Int. Cl.
| | |
|---|---|
| *B60T 7/12* | (2006.01) |
| *B60T 8/17* | (2006.01) |
| *B60T 8/172* | (2006.01) |
| *B60T 8/176* | (2006.01) |
| *B60W 10/04* | (2006.01) |

(Continued)

(52) U.S. Cl.
CPC ......... *B60W 30/18009* (2013.01); *B60T 7/12* (2013.01); *B60T 8/17* (2013.01); *B60T 8/1701* (2013.01); *B60T 8/172* (2013.01); *B60T 8/176* (2013.01); *B60T 8/1755* (2013.01); *B60W 10/04* (2013.01); *B60W 10/18* (2013.01); *B60G 2600/02* (2013.01); *B60G 2800/01* (2013.01); *B60G 2800/92* (2013.01); *B60T 2250/03* (2013.01); *B60T 2260/06* (2013.01); *B60T 2270/10* (2013.01); *B60W 2510/0604* (2013.01); *B60W 2510/0638* (2013.01); *B60W 2510/18* (2013.01); *B60W 2510/22* (2013.01); *B60W 2520/14* (2013.01); *B60W 2520/28* (2013.01); *B60W 2710/0605* (2013.01);
(Continued)

(58) Field of Classification Search
CPC ........... B60W 30/18009; B60W 10/18; B60W 10/04; B60W 2510/0638; B60W 2520/14; B60W 2720/14; B60W 2710/18; B60W 2510/18; B60W 2510/22; B60W 2520/28; B60W 2710/0644; B60W 2710/0605; B60W 2510/0604; B60G 2600/02; B60G 2800/92; B60T 2260/06
See application file for complete search history.

(56) References Cited

U.S. PATENT DOCUMENTS 6,275,763 B1 * 8/2001 Lotito .................. B60L 7/26
180/165
7,143,853 B1 * 12/2006 Mercier ............... B60T 8/1706
180/210

(Continued)

*Primary Examiner* — Jeffrey C Boomer

(57) ABSTRACT

One of the most popular and exhilarating stunts in off-road vehicle driving is catching air off a jump. Unfortunately, once the vehicle is in the air, the driver loses significant control of the vehicle. An electronic vehicle control system is described herein that addresses this problem. The system may include an ABS module, a shock position sensor, and an ABS override module. The ABS override module may be coupled to the shock position sensor and the ABS module. The ABS override module may receive a shock-extended signal from the shock position sensor indicating one or more of the shocks are fully extended. The ABS override module may send a stop-ABS signal that may prevent the ABS module from operating. The ABS override module may additionally be connected to a yaw rate sensor, the brakes, and the throttle, and may automatically control the pitch, roll and yaw of the vehicle.

20 Claims, 19 Drawing Sheets

(51) Int. Cl.
*B60W 10/18* (2012.01)
*B60W 30/18* (2012.01)
*B60T 8/1755* (2006.01)

(52) U.S. Cl.
CPC . *B60W 2710/0644* (2013.01); *B60W 2710/18* (2013.01); *B60W 2720/14* (2013.01)

(56) References Cited

U.S. PATENT DOCUMENTS

| | | | | |
|---|---|---|---|---|
| 9,308,876 B2* | 4/2016 | Doerr | | B60R 16/0233 |
| 2003/0074126 A1* | 4/2003 | Walenty | | B60T 7/042 |
| | | | | 701/71 |
| 2004/0010383 A1* | 1/2004 | Lu | | B60G 17/0162 |
| | | | | 702/41 |
| 2004/0019418 A1* | 1/2004 | Lu | | B60G 17/0162 |
| | | | | 701/38 |
| 2004/0064236 A1* | 4/2004 | Lu | | B60G 17/0162 |
| | | | | 701/70 |
| 2005/0077691 A1* | 4/2005 | Witters | | B60G 11/27 |
| | | | | 280/5.514 |
| 2006/0180372 A1* | 8/2006 | Mercier | | B60T 8/1706 |
| | | | | 180/210 |
| 2007/0192002 A1* | 8/2007 | Iyoda | | B60G 17/0164 |
| | | | | 701/37 |
| 2008/0269994 A1* | 10/2008 | Karlsson | | B60T 8/17616 |
| | | | | 701/48 |
| 2011/0297462 A1* | 12/2011 | Grajkowski | | B60K 26/04 |
| | | | | 180/54.1 |
| 2013/0030649 A1* | 1/2013 | Matsuda | | B60T 8/1706 |
| | | | | 701/38 |
| 2014/0167950 A1* | 6/2014 | Shima | | B60C 23/0416 |
| | | | | 340/447 |
| 2015/0057885 A1* | 2/2015 | Brady | | B60G 17/06 |
| | | | | 701/38 |
| 2015/0224845 A1* | 8/2015 | Anderson | | B60G 17/019 |
| | | | | 701/37 |
| 2016/0325748 A1* | 11/2016 | Mori | | B60L 15/2009 |
| 2016/0339924 A1* | 11/2016 | Azuma | | B60W 50/0098 |
| 2017/0087950 A1* | 3/2017 | Brady | | B60G 17/06 |
| 2017/0137023 A1* | 5/2017 | Anderson | | B60G 17/0195 |
| 2018/0141543 A1* | 5/2018 | Krosschell | | B60W 10/06 |
| 2018/0297435 A1* | 10/2018 | Brady | | B60G 17/06 |
| 2018/0354336 A1* | 12/2018 | Oakden-Graus | | B60G 17/08 |

* cited by examiner

BIG AIR ELECTRONIC CONTROL MODULE

TECHNICAL FIELD

This invention relates generally to the field of vehicle electronic control units.

BACKGROUND

One of the most popular and exhilarating stunts in off-road vehicle driving is catching air off a jump. Unfortunately, once the vehicle is in the air, the driver loses significant control of the vehicle. Skilled riders and drivers regain some control by manipulating the brakes and throttle to adjust the orientation of the vehicle. However, such skill requires intensive training to acquire, and thus are out of the reach of many recreational drivers and riders. Additionally, vehicles with ABS systems lose significant control through braking. These issues have yet to be addressed.

SUMMARY OF THE INVENTION

Embodiments of a vehicle electronic control system are described herein that address at least some of the issues described in the Background. Various embodiments may include a vehicle bus, an ABS (Antilock Braking System) module, a shock position sensor, and an ABS override module. The ABS module may be electrically coupled to a brake actuator via the vehicle bus. The shock position sensor may detect a percentage a corresponding shock is compressed. The ABS override module may be coupled to the shock position sensor and the ABS module via the vehicle bus. The ABS override module may receive a shock-extended signal from the shock position sensor. The shock-extended signal may indicate the shock is compressed. The shock may be compressed from 0% to 1%, from 0% to 5%, or from 0% to 10%. The ABS override module may send a stop-ABS signal. The stop-ABS signal may prevent the ABS module from communicating with the brake actuator. The ABS override module may send the stop-ABS signal in response to receiving the shock-extended signal.

BRIEF DESCRIPTION OF THE DRAWINGS

A more particular description of the system summarized above is made below by reference to specific embodiments. Several embodiments are depicted in drawings included with this application, in which.

DETAILED DESCRIPTION

Figure 1:
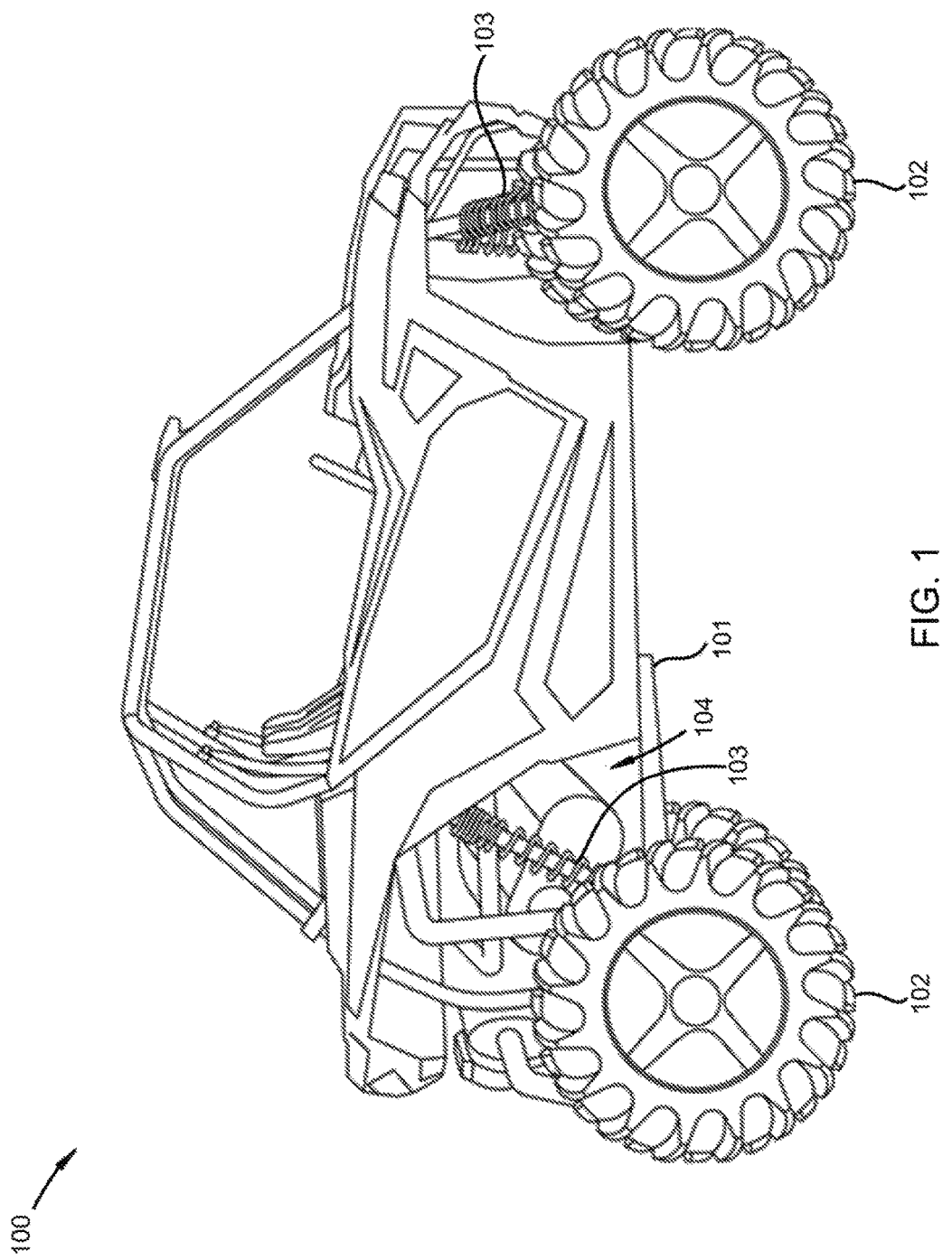
FIG. 1 depicts an embodiment of an ORV incorporating an electronic control system as described herein.

A detailed description of embodiments of a vehicle electronic control system is provided below by example, with reference to embodiments in the appended figures. Those of skill in the art will recognize that the features of the as described below and as depicted by example in the figures below could be arranged and designed in a wide variety of different configurations. Thus, the detailed description of the embodiments in the figures is merely representative of embodiments of the invention, and is not intended to limit the scope of the invention as claimed.

Various embodiments of a vehicle electronic control system may include a vehicle bus, an ABS module, a shock position sensor, and an ABS override module. The ABS module may be electrically coupled to a brake actuator, such as via the vehicle bus. The shock position sensor may detect a percentage a corresponding shock is compressed. The ABS override module may be coupled to the shock position sensor and the ABS module, such as via the vehicle bus. The ABS override module may receive a shock-extended signal from the shock position sensor. The shock-extended signal may indicate the shock is compressed. The shock may be compressed from 0% to 1%, from 0% to 5%, or from 0% to 10%. The ABS override module may send a stop-ABS signal. The stop-ABS signal may prevent the ABS module from communicating with the brake actuator. The ABS override module may send the stop-ABS signal in response to receiving the shock-extended signal.

Various types of vehicles may include the electronic control system described herein. Some such vehicles include off-road recreational vehicles (ORVs), various views and embodiments of which are depicted in the FIGs. Despite this, those of skill in the art recognize the general applicability of the components described herein to a variety of vehicles. Thus, as used herein, "vehicle" may refer, generally, to any of a variety of inanimate passenger or cargo carriers, including landcraft, watercraft, aircraft, and combinations thereof. Examples include automobiles, all-terrain vehicles, amphibious vehicles, buses, trucks, cars, rickshaws, bicycles, motorcycles, cable cars, sleds, golf carts, drones, handcars, hovercraft, land yachts, locomotives, maglevs, minibuses, minivans, monorails, monowheels, mopeds, omni directional vehicles, quadracycles, rocket sleds, rovers, sea tractors, ground effect vehicles, boats, ships, catamarans, canoes, hydrofoils, jet skis, kayaks, ferries, airplanes, helicopters, autogyros, balloons, gliders, ornithopters, pedalos, powered parachutes, and rockets, among others.

The vehicle may include any of a variety of mechanisms for travelling across and/or through surfaces, such as wheels, skis, skids, hulls, and airfoils. In wheeled embodiments, the vehicle may include any of a variety of drive trains, including front-wheel drive, rear-wheel drive, three-wheel drive, four-wheel drive, or combinations thereof. For example, the vehicle may incorporate electronics that switch the drive train between front-wheel drive and three-wheel drive, or between rear-wheel drive and four-wheel drive. The vehicle may include any of a variety of mechanisms for accessing the vehicle, such as doors, windows, hatches, and permanent openings. In various embodiments, the vehicle may include a chassis on which various vehicle components are mounted. The vehicle may also, in some embodiments, include components such as body panels, an engine or motor, a transmission, an electrical system, one or more batteries, a heating and/or cooling system, navigational systems, and a fuel system, among others. Various vehicle components may be comprised of any of a variety of materials and material combinations, such as metal, plastic, rubber, leather, glass and composites.

The chassis may include any of a variety of base structures for the vehicle, including a ladder frame, a unibody frame, a backbone tube frame, an X-frame, a perimeter frame a platform frame, a space frame, a vehicle subframe, or combinations thereof. The chassis may be formed of any of a variety of materials, including aluminum, steel, carbon, other metal alloys, and/or combinations thereof. The chassis may incorporate various rail designs, such as c-shape, hat, boxed, tubular, planar, and/or combinations thereof. The chassis may include space for various segments of the vehicle, including a passenger and/or cargo compartment and an engine cradle.

The vehicle bus may comprise any of a variety of localized networking protocols and/or wiring architectures. In general, the vehicle bus may interconnect components inside the vehicle. The vehicle bus may have such features as assurance of message delivery, with a failure rate of less than one percent, less than one tenth of one percent, or less than one-hundredth of a percent; non-conflicting messages; minimal time of delivery, with a time of delivery dependent on the latency in the hardwire; low cost; EMF noise resilience; and redundant routing, which may increase noise resilience and may reduce the failure rate. Examples of such networks may include avionics full-duplexed switched Ethernet (AFDX), ARINC, byteflight, controller area networks (CAN), domestic digital bus, flexray, DC-BUS, IDB-1394, inter equipment bus, inter-integrated circuit, ISO 9141-1/-2, SAE J1708/1587/1850/1939, ISO 11783, keyword protocol 2000, local interconnect networks (LIN), media oriented systems transport, SMARTwireX, serial peripheral interface, Ethernet, and/or TCP/IP, among others. Physical transmission media used in the vehicle bus may include single wire, twisted pair, fiber optic, IEEE 1394, MIL-STD-1553/1773, power-line communication, and/or 16 pin OBD-2, among others.

The vehicle bus may include an open protocol, a proprietary protocol, or may include a proprietary protocol overlaid over an open protocol. One such proprietary protocol may include an ABS override bus. The ABS override bus may include a unique signal, such as a unique frequency variation from the vehicle bus, and/or may include a separate physical medium. For example, in one embodiment, the ABS module may be electrically connected to the brake actuator via a CAN bus. A switch may be disposed on the CANbus between the ABS module and other electronic vehicle components connected to the CANbus. The ABS override module may be electrically connected to the switch via a dedicated wire between the ABS override module and the switch. The ABS override module may send a signal to open the switch, which may prevent signals from other components, such as wheel speed sensors, from reaching the ABS module.

The ABS module may include an electronic controller unit (ECU) storing programmed instructions that, when executed, may prevent the wheels of the vehicle from skidding during a hard stop. In general, the ABS system may include the ECU, one or more wheel speed sensors, and one or more release valves connected to a brake line, and/or one or more pumps connected to the brake line. The release valves may be disposed between one or more primary hydraulic pumps connected to a brake pedal and one or more calipers around a wheel rotor. The ABS module may detect a drastic reduction in wheel speed and send a signal to open the release valve, which may prevent the caliper from clamping down on the rotor and slowing the wheel speed further. The ABS module may communicate with the release valves via the vehicle bus and/or a separate, dedicated ABS bus. The ABS pump may reintroduce fluid lost through the release valve into the primary pump.

The vehicle electronic control system may include one or more shock position sensors, such as one shock position sensor, two shock position sensors, three shock position sensors, and/or four shock position sensors. The shock position sensors may be incorporated into the vehicle's shocks/struts, may be installed with the vehicle suspension separate from the shocks/struts, and/or may be installed as OEM or after-market. The shock position sensors may include any of a variety of position sensors, including a capacitive transducer, capacitive displacement sensor, an eddy-current sensor, an ultrasonic sensor, a grating sensor, a hall effect sensor, an inductive non-contact position sensor, a laser doppler vibrometer, a linear variable differential transformer, a multi-axis displacement transducer, a photo-diode array, a piezo-electric transducer, a potentiometer, a proximity sensor, a rotary encoder, and/or a string potentiometer, among others.

The vehicle may include one or more shock dampers, or "shocks." The shocks may be integrated into the suspension in a variety of ways, such as part of the struts, separately in addition to struts, or in a strutless system. The suspension system may generally include a passive system, a semi-active system, an active suspension system, an interconnected system, a dependent system, an independent system, a semi-independent system, a tilting system, and/or a rocker-bogie system, among others. The shocks may include one or more of a hydraulic shock, a pneumatic shock, and/or a coilover shock. The shocks may have a range of travel ranging from eight inches to 30 inches, 10 inches to 24 inches, and/or 12 inches to 18 inches. For example, in one embodiment, the front shocks may have a range of travel of 12 inches, including four inches extended and eight inches compressed, and the rear shocks may have a range of travel of 18 inches, including six inches extended and 12 inches compressed. Alternatively, the extended:compressed ratio may be 1:1.

The vehicle and/or vehicle electronic control system may include various other components, such as one or more wheel speed sensors, one or more yaw sensors, a throttle, and one or more rev limiters. One or more of the components may be electrically connected to one or more of the ABS module and the ABS override module. For example, the components may be electrically coupled to the vehicle bus. The wheel speed sensors may correspond to one wheel, all wheels, or a range between one wheel and all the wheels. The yaw sensors may include a multi-axis yaw sensor. The multi-axis yaw sensor may include a yaw rate sensor that determines a yaw rate about a single axis, about two perpendicular axes, about three perpendicular axes, about four axes, and/or about five axes. The yaw rate sensor may include an ECU that stores instructions for gathering information about the yaw change rate. For example, the ECU may be pre-set at zero yaw. The yaw rate sensor may indicate to the ECU a change in the yaw. The ECU may calculate a current yaw based on the change in the yaw.

The vehicle may include a rev limiter. The rev limiter may comprise a module programmed into the vehicle's general ECU, and/or may include an after-market microcontroller electrically coupled to the vehicle bus and/or ECU. The ECU/microcontroller may include two rev limiter modules: an in-air rev limiter and an on-ground rev limiter. The rev limiter may determine whether the vehicle is in-air or on-ground based on signals sent from the shock position sensors. For example, the rev limiters may be electrically coupled to the ABS override module. The ABS override module may send an in-air rev limit signal to the rev limiter that activates the in-air rev limiter module. In some embodiments, the ABS override module sends the in-air rev limit signal in response to preventing the ABS module from communicating with the brake actuator. This may prevent a user from over-revving and/or burning out the vehicle motor. The rev limiter may be connected to the ABS override bus, or the shock position sensors and the rev limiter may be connected to the vehicle bus. The on-ground rev limit may limit rotation of the vehicle motor to a range from 4000 rpm to 5000 rpm, from 4500 rpm to 5500 rpm, from 5000 rpm to 6000 rpm, from 5500 rpm to 6500 rpm, from 6000 rpm to 7000 rpm, from 6500 rpm to 7500 rpm, from 7000 rpm to 8000 rpm, from 7500 rpm to 8500 rpm, from 8000 rpm to 9000 rpm, from 8500 rpm to 9500 rpm, or from 9000 rpm to 12,500 rpm. The in-air rev limit may be lower than the on-ground rev limit by a range from 100 rpm to 250 rpm, from 250 rpm to 500 rpm, from 500 rpm to 1000 rpm, from 1000 rpm to 2000 rpm, from 2000 rpm to 3000 rpm, from 3000 rpm to 4000 rpm, from 4000 rpm to 5000 rpm, from 5000 rpm to 6000 rpm, from 6000 rpm to 7000 rpm, from 7000 rpm to 8000 rpm, or from 8000 rpm to 9000 rpm.

As briefly described above, the vehicle electronic control system may include at least one switch electrically disposed between one or more of the ABS module, the ABS override module, and the brake actuator. For example, preventing the ABS module from communicating with the brake actuator may include opening the switch. In some embodiments, such as those including a CAN bus and a separate ABS override bus, one or more of the switch, the ABS module, the brake actuator, and the ABS override module may be electrically coupled via one or more of the CAN bus and the ABS override bus. In a specific example, the switch is electrically coupled to the CAN bus and the ABS override bus, the ABS module is electrically coupled to the CAN bus via the switch, and the ABS override module is electrically coupled to the switch via the ABS override bus. The switch and ABS override module may be incorporated and/or controlled by a single microcontroller, and the ABS override module may communicate with the switch via a PCB. The PCB may electrically connect the ABS override module to the CAN bus, via which the ABS override module may receive one or more signals from the shock position sensors, the wheel speed sensors, the yaw rate sensors, the throttle, and/or the brake actuator.

In various embodiments, the ABS module and the ABS override module may be implemented on the same controller. For example, the ABS override module may include instructions programmed into a microcontroller to listen for signals from the shock position sensors. The ABS override module may be programmed into the general programming of the ABS module as an if-then-else statement, where the if-then portion may provide the instructions to for overriding the ABS system if the shock-extended signal is received, and where the then statement may provide the instructions for executing the remainder of the ABS module, such as operating the ABS system upon receiving a signal from one or more wheel speed sensors. In some embodiments, the ABS override may be implemented as programming in the vehicle's central ECU.

The vehicle electronic control system may include one or more of a visual and an audio indicator. The indicator may be electrically coupled to the ABS override module, such as via the vehicle bus and/or the ABS override bus. The indicator may indicate to a user the ABS override module is preventing the ABS module from communicating with the brake actuator. The indicator may be separate from the ABS indicator light. This may allow a user of the vehicle to distinguish between an ABS malfunction/failure and an ABS override.

The ABS override module may include an electronic controller. The electronic controller may store programmed instructions that, when executed, prevent the ABS module from operating. The ABS override module may receive signals from the shock position sensors, the wheel speed sensors, a manual throttle control, a manual brake control, or a yaw rate sensor, among others. The ABS override module may reactivate the ABS module. The ABS override module may actuate the brakes and/or throttle to adjust the vehicle's position in-air.

The ABS override module may prevent anti-lock braking from occurring. This may be important for increasing the control an operator of the vehicle has over the vehicle's yaw in any of a variety of directions. As used herein, yaw may refer to rotation about a vertical axis, and/or rotation about either or both horizontal axes perpendicular to the vertical axis. Thus, yaw, as used herein, may refer to yaw, pitch, and/or roll. The words pitch and roll are also used throughout to refer to rotation about the horizontal axes. As the vehicle is in-air, the vehicle's brakes may be applied. This may cause the vehicle to pitch forward or to roll. For example, if the brakes are applied to all the wheels, the vehicle will pitch forward. If the brakes on one side of the vehicle are applied, the vehicle will pitch forward and roll towards that side of the vehicle. Conversely, if the throttle is applied, the vehicle will pitch back. This may be beneficial in correcting the vehicle out of an endo.

The ABS override module may receive a shock-extended signal from the shock position sensor/sensors. The shock-extended signal may indicate the shock is fully extended (0% compressed), or extended enough that there is insignificant friction between the vehicle tires and the ground. In such situations, the shock may be compressed from 0% to 1%, from 0% to 5%, or from 0% to 10%. Additionally, the ABS override module may receive a shock-compressed signal from the shock position sensor indicating the shock is compressed from greater than 1% to 100%, from greater than 5% to 100%, or from greater than 10% to 100%. The ABS override module may, in response to receiving the shock-compressed signal, allow the ABS module to communicate with the brake actuator. Such may be accomplished by, for example, closing the switch between the CAN bus and the ABS module.

In some embodiments, the ABS module may be electrically coupled to the brake actuator via a bus separate from the CAN bus. The ABS module may communicate with the wheel speed sensors via the CAN bus. The ABS override module may prevent the wheel speed sensors from communicating with the ABS module, such as by the switch described above. In another embodiment, the ABS override module may send a dummy wheel speed to the ABS module that "tricks" the ABS module into not activating. The ABS override module may intercept the wheel speed and alter the data to give the indication the wheel speed is higher than it actually is, or to give the indication the wheel speed is changing less drastically than it actually is. For example, the ABS override module may record a wheel speed before the shock sensors send the shock-extended signal and, in response to receiving the shock-extended signal, may forward a dummy wheel speed to the ABS module equal to the pre-signal wheel speed.

In order to prevent the ABS module from communicating with the brake actuator, the ABS override module may require a set of conditions to be met. Such conditions may include receiving the shock-extended signal from one of the vehicle's shock position sensors, from two of the vehicle's shock position sensors, from three of the vehicle's shock position sensors, otherwise from four of the vehicle's shock position sensors, et cetera, up to and/or including receiving the shock-extended signal from all of the vehicle's shock position sensors.

The ABS override module may automatically adjust the vehicle's in-air yaw for a user so that the user does not have to make the adjustment manually. In such embodiments, the ABS override module may be electrically coupled to one or more of the multi-axis yaw sensor and the throttle. The ABS override module may receive a yaw signal from the yaw sensor indicating a current yaw of the vehicle about one or more axes, such as the perpendicular axes described above. In response to receiving the yaw signal, the ABS override module may compare the current yaw of the vehicle to a desired yaw of the vehicle. The desired yaw of the vehicle may be perpendicular to the force of gravity on the vehicle, or may be determined as the vehicle is in the air based on the trajectory of the vehicle and the terrain along the trajectory. For example, the ABS override module may determine a trajectory of the vehicle based on the speed of the vehicle before it became air-borne and the yaw of the vehicle. The vehicle may include one or more terrain sensors along the bottom of the vehicle. Such sensors may include ultrasonic sensors and/or LiDAR sensors. The terrain sensors may ping the terrain below and/or around the vehicle. Based on the terrain, the ABS override module may calculate a desired yaw of the vehicle. For example, the ABS override module may determine the vehicle will touch down on a portion of the terrain parallel to the horizon. The ABS override module may adjust the yaw of the vehicle by communicating with the brake actuator and/or the throttle to be parallel to the horizon. In general, the ABS module may, in response to comparing the current yaw of the vehicle to the desired yaw of the vehicle, determine the current yaw is not equal to the desired yaw. In response to such a determination, the ABS override module may send a signal that actuates the throttle, the brake actuator, or both.

Various embodiments of the system and components of the system described above are depicted in the appended FIGs. and described below regarding those FIGs.

FIG. 1 depicts an embodiment of an ORV incorporating an electronic control system as described herein. The ORV 100 includes a chassis 101, wheels 102, shocks 103, and an engine 104. As depicted the ORV includes a rear engine design. However, in various embodiments, the vehicle may include a front-engine design, a front-mid engine design, or a rear-mid engine design.

Figure 2A:
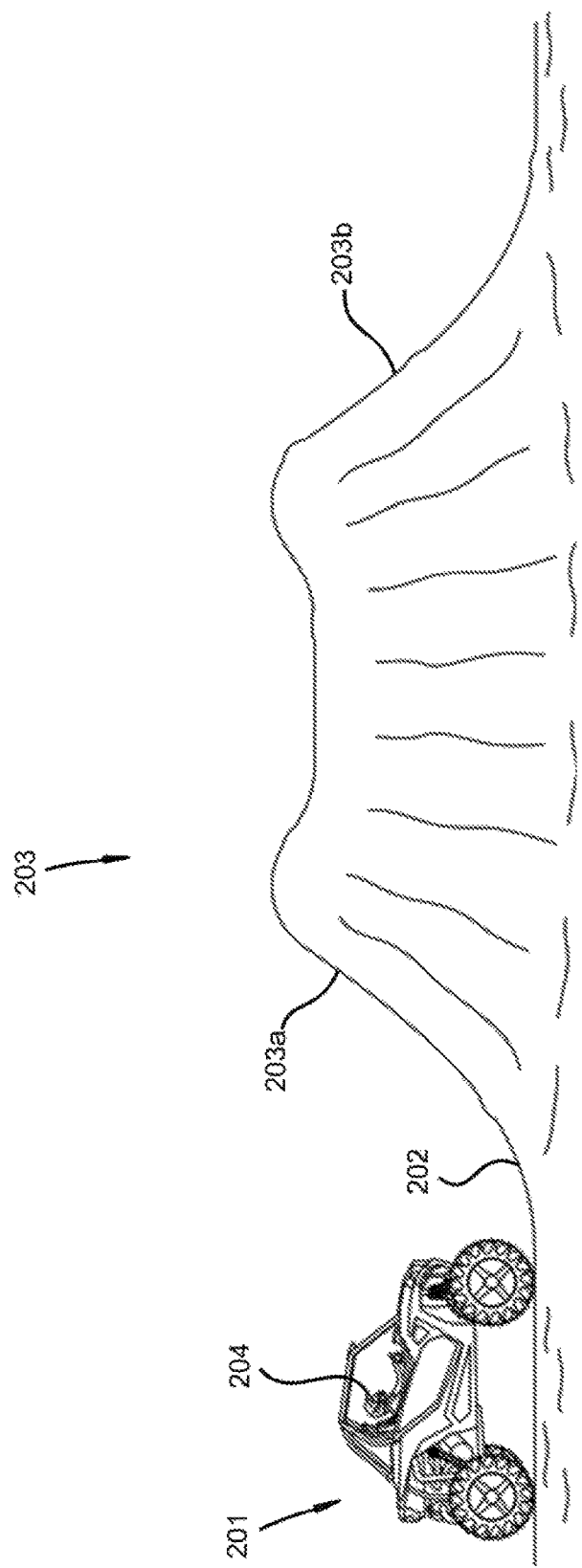
FIGS. 2A-D depict an embodiment of an ORV jumping over a hill.
Figure 2B:
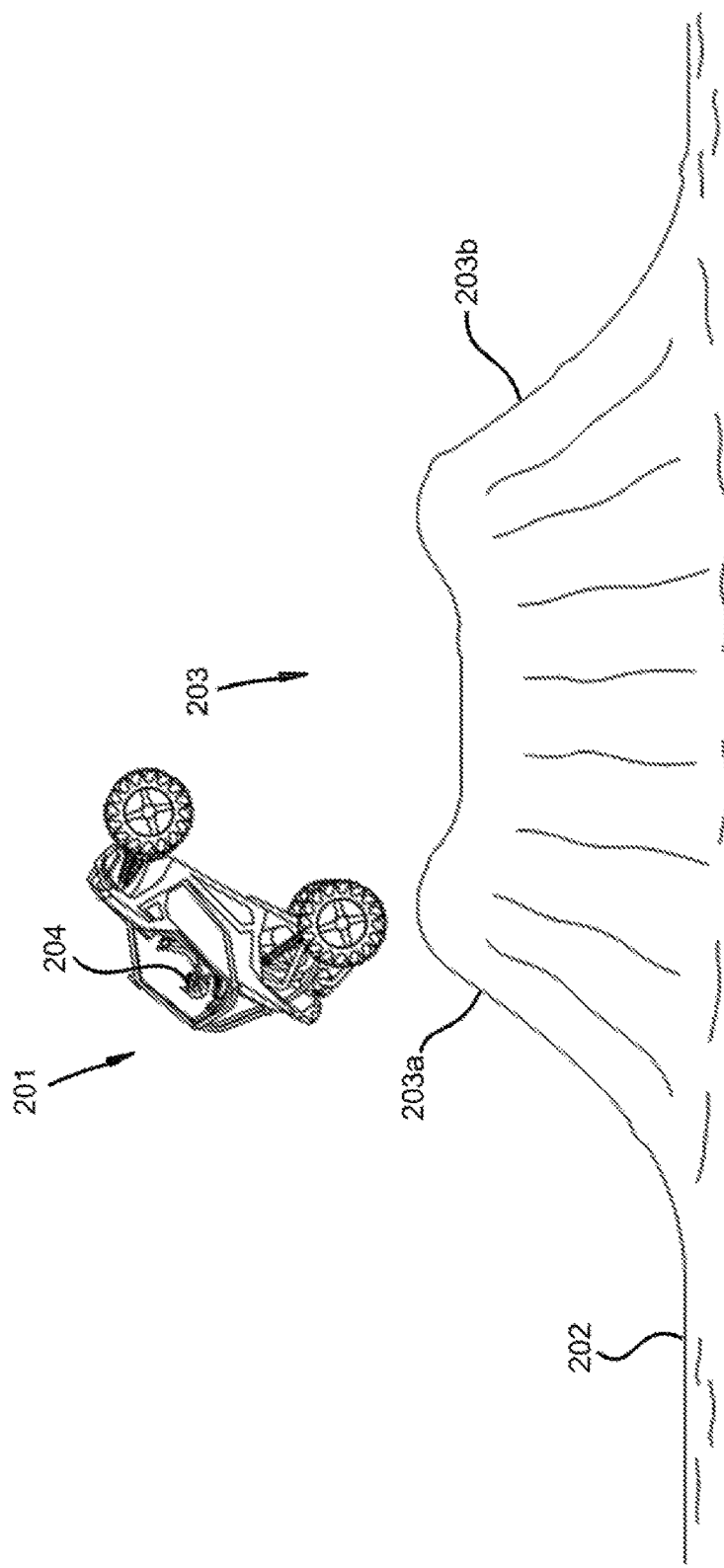
Figure 2C:
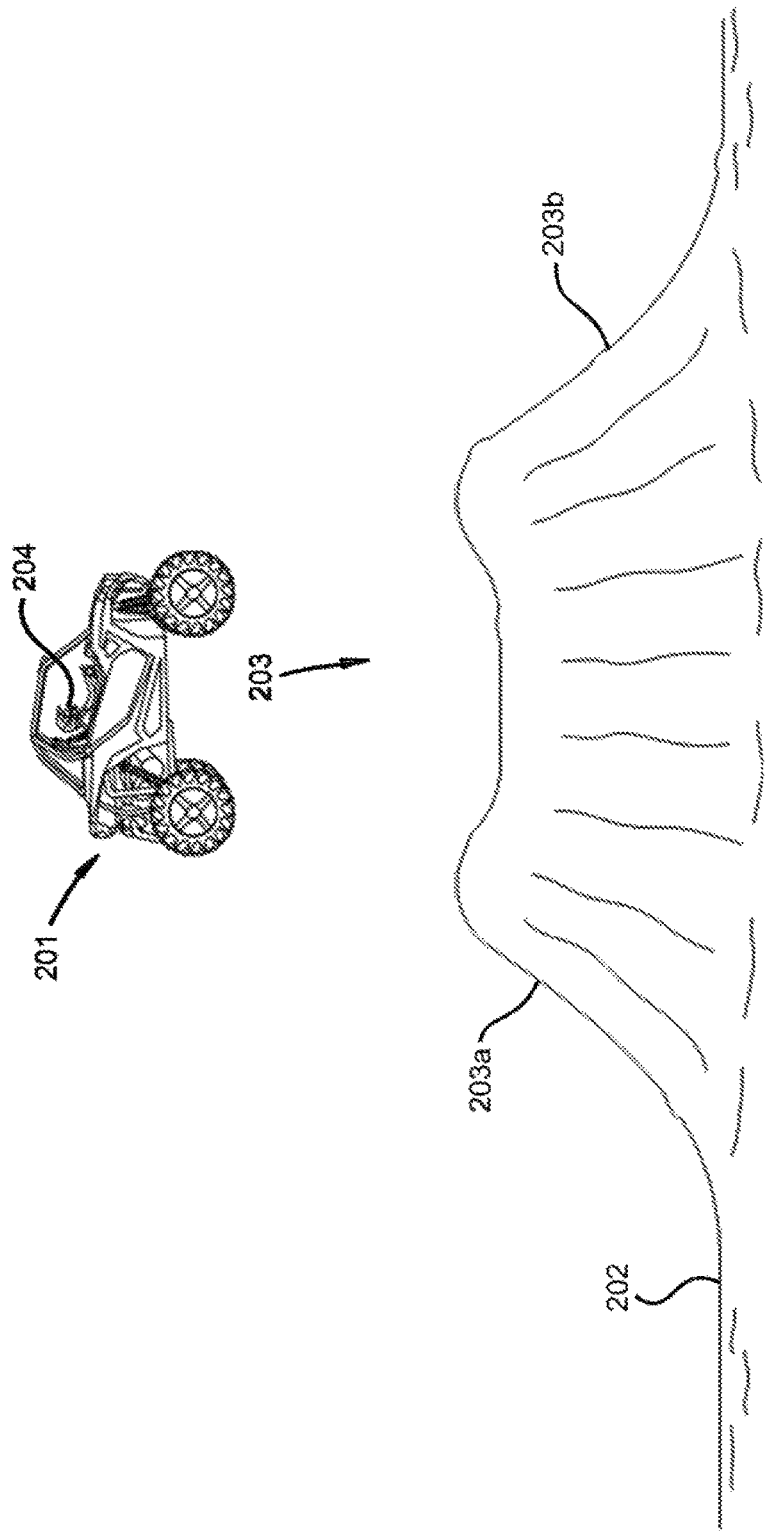
Figure 2D:
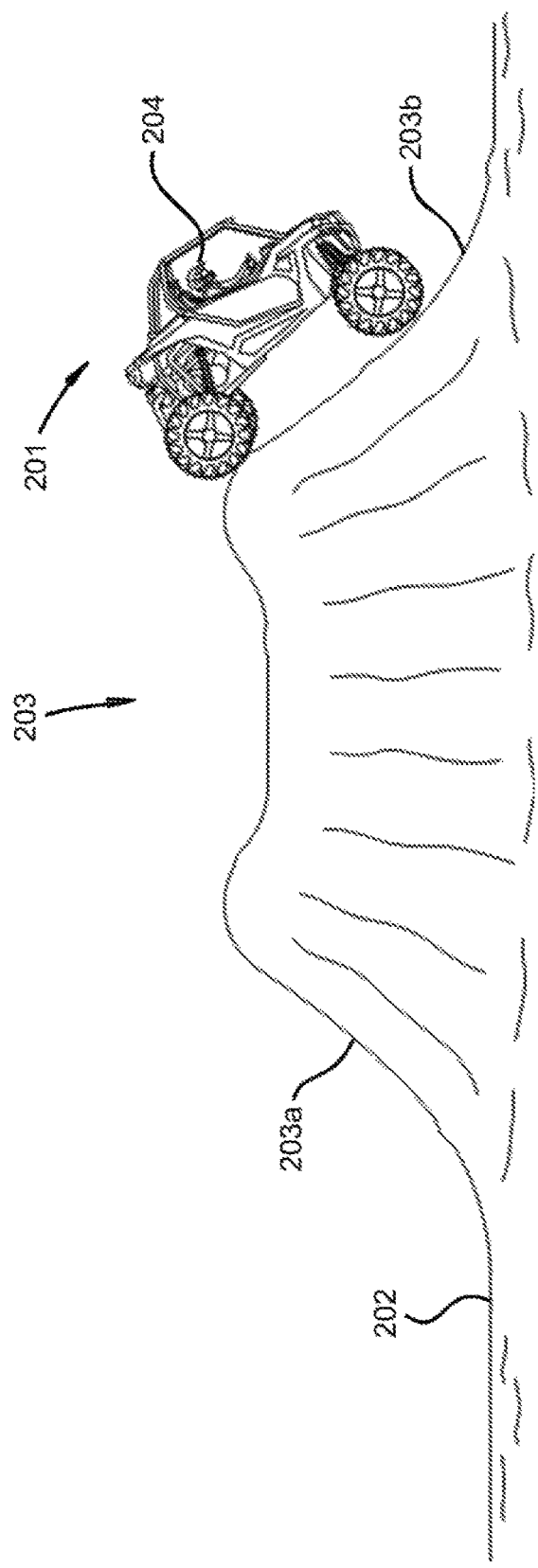

FIGS. 2A-D depict an embodiment of an ORV jumping over a hill. FIG. 2A depicts the ORV 201 rolling on the ground 202 towards the hill 203. The hill includes a front side 203a and a back side 203b. FIG. 2B depicts the ORV on the front side of the hill as it is leaving the hill. FIG. 2C depicts the ORV in the air over the hill. FIG. 2D depicts the ORV landing on the back side of the hill. As shown in the series of FIGS. 2A-D, the ORV shifts mid-air from a rear pitch on the front side of the hill to a forward pitch on the back side of the hill. This takes significant strain off the ORV's suspension as the ORV lands and gives the driver 204 significantly more control as the ORV lands.

Figure 3A:
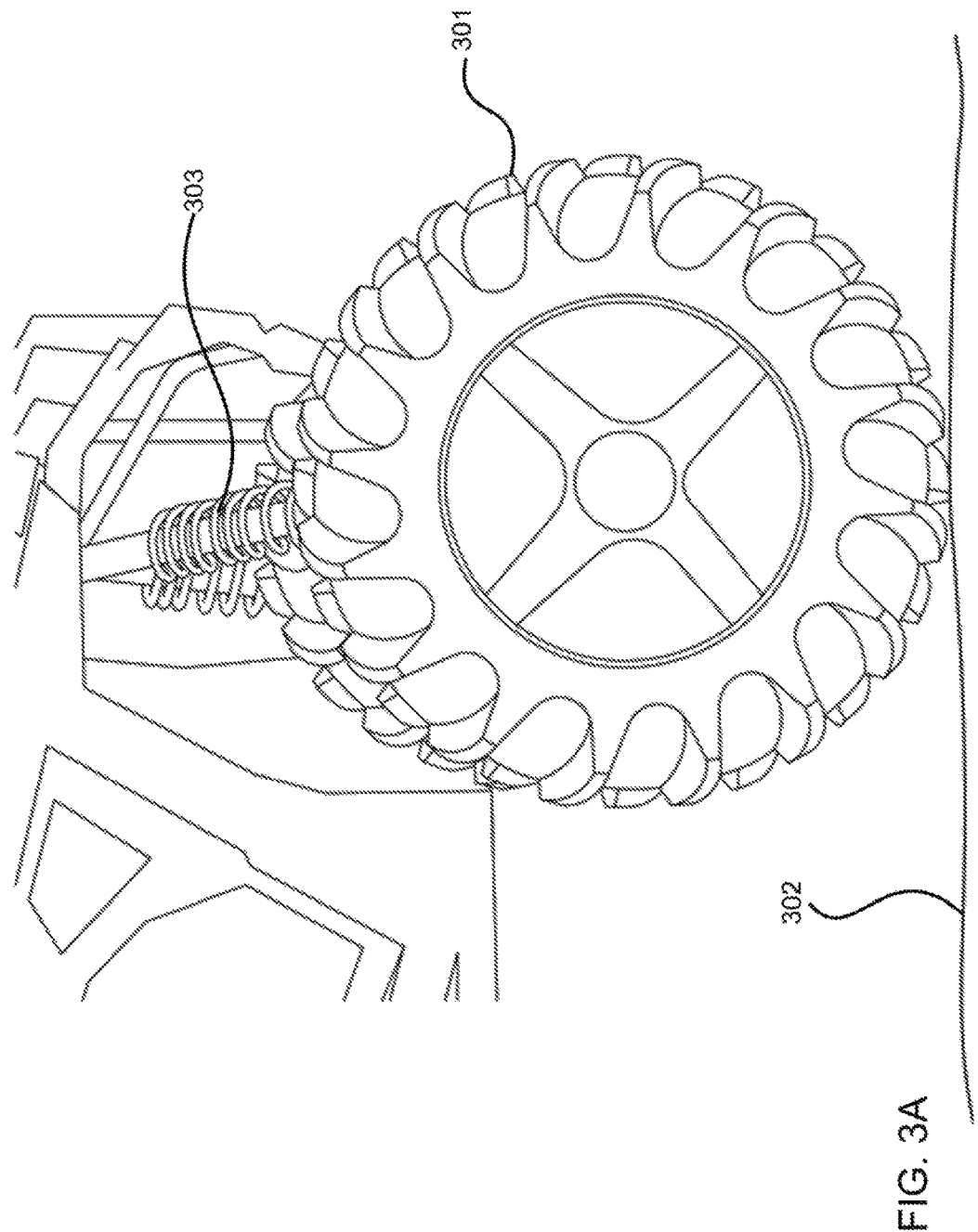
FIGS. 3A-B depict zoomed-in views of an ORV wheel and shock.
Figure 3B:
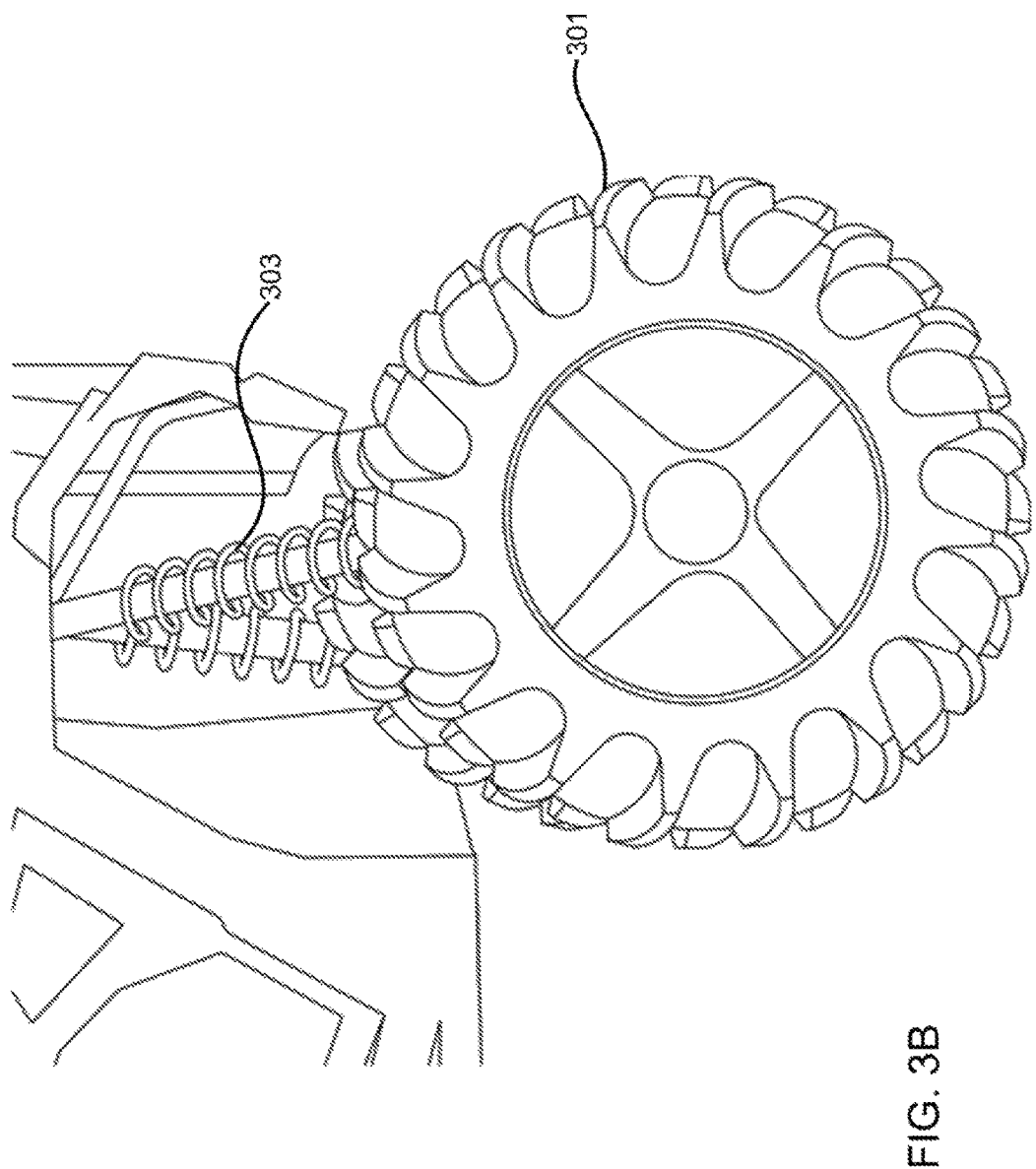

FIGS. 3A-B depict zoomed-in views of an ORV wheel and shock. In FIG. 3A, the wheel 301 is on the ground 302. The shock 303 sags under the weight of the ORV, and is compressed. In FIG. 3B, the wheel is in the air. The shock thus does not support the weight of the ORV, and is fully extended.

Figure 4:
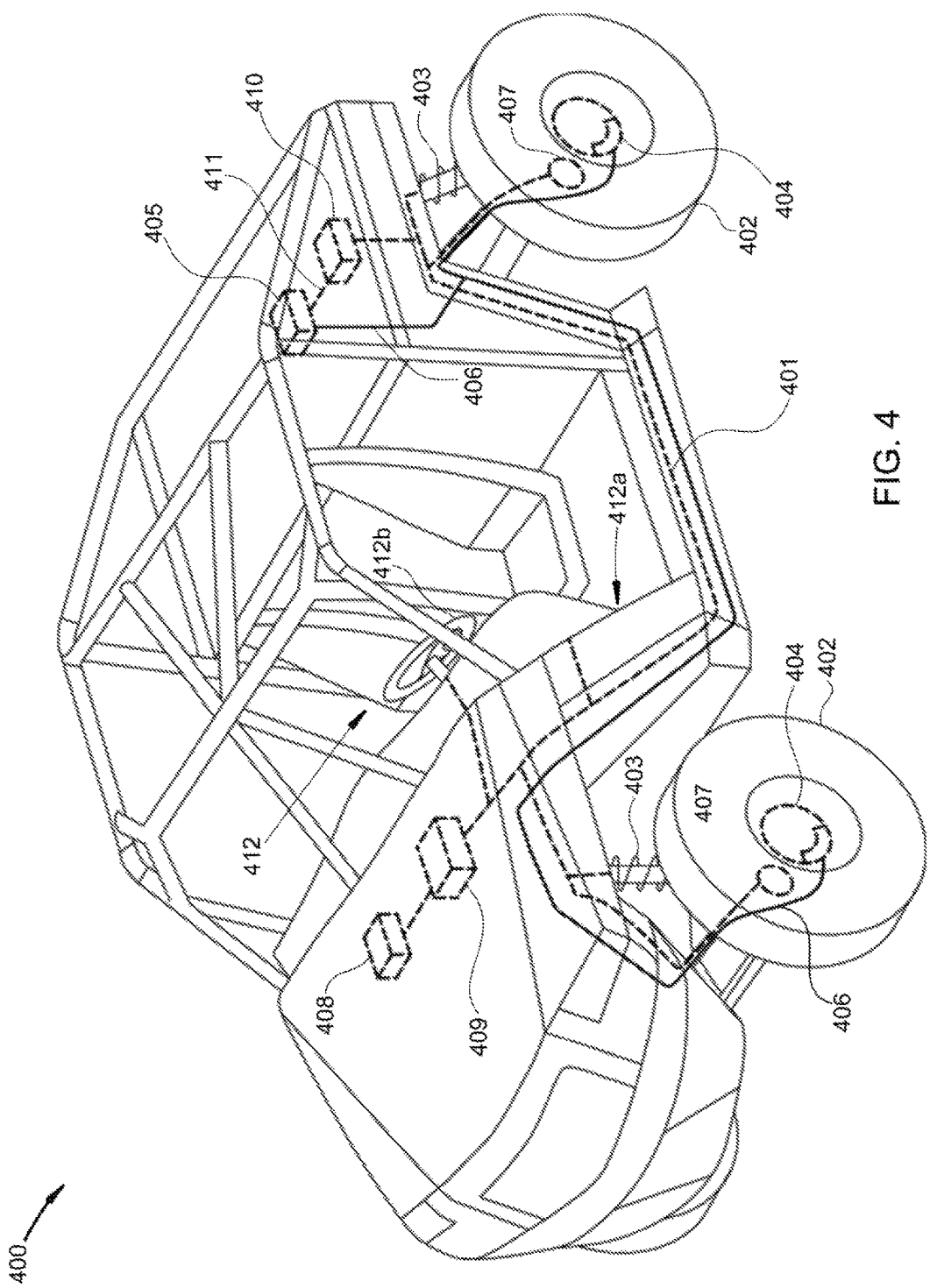
FIG. 4 depicts a view of a CAN bus implemented in an ORV.

FIG. 4 depicts a view of a CAN bus implemented in an ORV. The ORV 400 includes the CAN bus 401, wheels 402, shocks 403 with built-in shock position sensors, brakes 404, ABS controller 405, brake lines 406, wheel speed sensors 407, yaw rate sensor 408, ECU 409, ABS override switch 410, an ABS override bus 411, and an in-air operation unit 412. The ECU, ABS override switch, wheel speed sensors, yaw rate sensors, and shock position sensors are interconnected by the CAN bus. The ABS controller is connected to the ABS override switch by the ABS override bus. The ABS override switch controls which signals reach the ABS controller, including signals sent over the CAN bus from the wheel speed sensors. The in-air operation unit includes the throttle 412a and buttons disposed on the steering wheel 412b that control the brakes in-air. The in-air operation unit is connected to the CAN bus. The ECU stores instructions accept inputs from the in-air operation unit as the shock sensors indicate the shocks are fully extended. Thus, the ABS module is implemented on the ECU and in a separate controller which, acting together, form the ABS module.

Figure 5A:
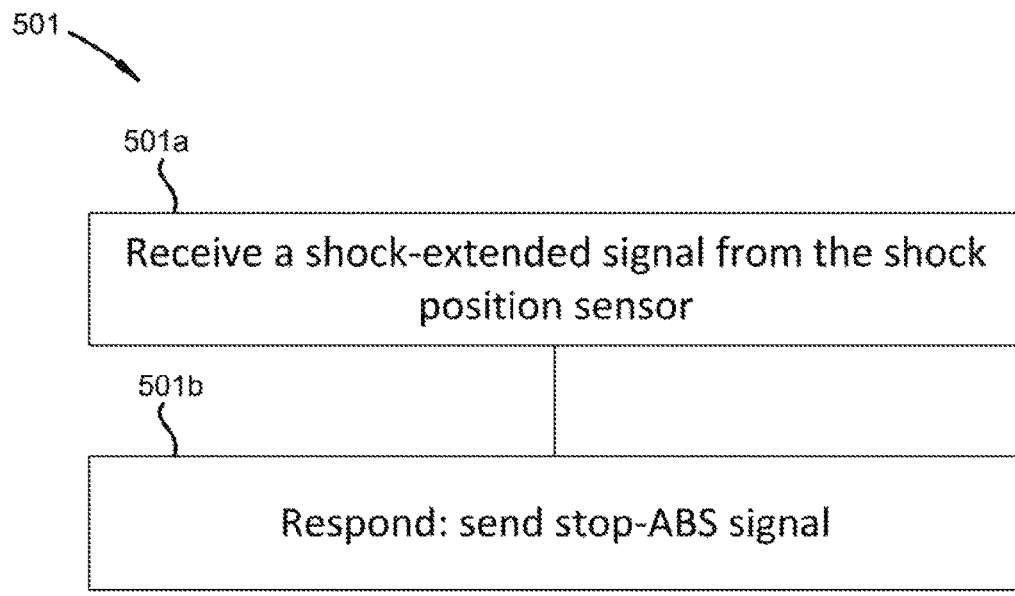
FIGS. 5A-H depict various methods of executing an ABS override.
Figure 5B:
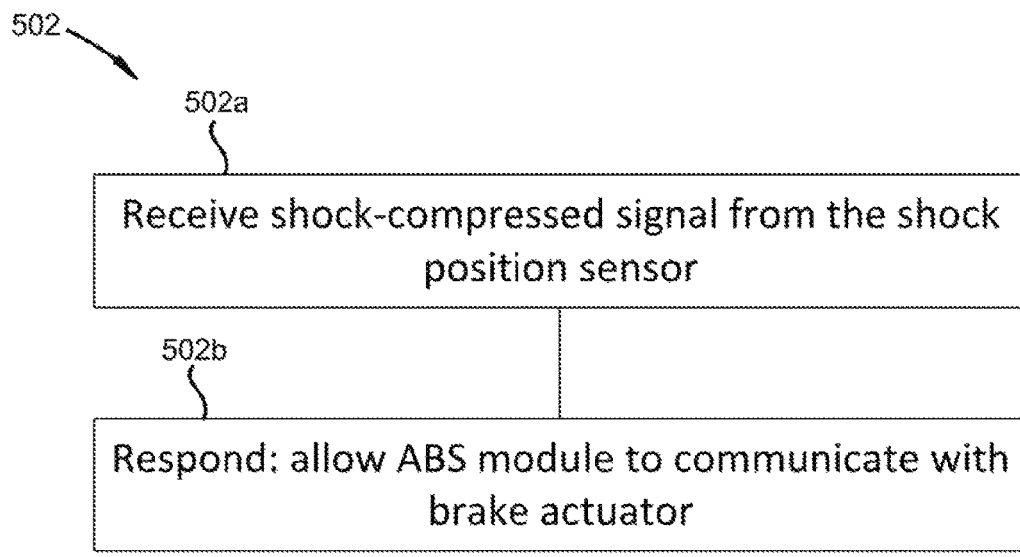

FIGS. 5A-H depict various methods of executing an ABS override. As shown in FIG. 5A, a method 501 of executing an ABS override includes, at block 501a, receiving a shock-extended signal from a shock position sensor. The signal may indicate the shock is compressed from 0% to 1%, from 0% to 5%, or from 0% to 10%. At block 501b, the method includes, in response to receiving the shock-extended signal, sending a stop-ABS signal that prevents the ABS module from communicating with the brake actuator. As shown in FIG. 5B, a method 502 of executing an ABS override includes, at block 502a, receiving a shock-extended signal from a shock position sensor. The signal may indicate the shock is compressed from greater than 1% to 100%, from greater than 5% to 100%, or from greater than 10% to 100%. At block 502b, the method includes, in response to receiving the shock-compressed signal, allowing the ABS module to communicate with the brake actuator.

Figure 5C:
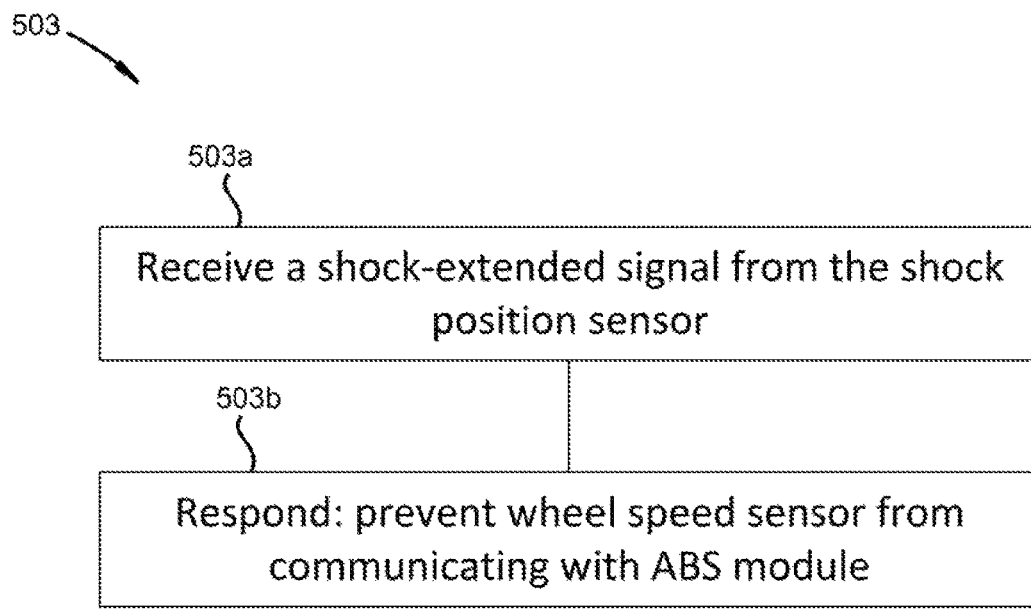
Figure 5D:
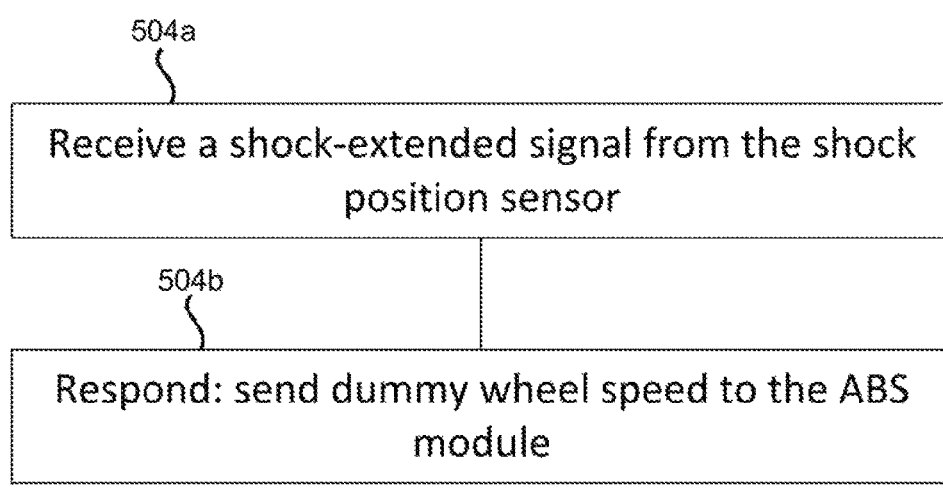

As shown in FIG. 5C, a method 503 of executing an ABS override includes, at block 503a, receiving a shock-extended signal from a shock position sensor. The signal may indicate the shock is compressed from 0% to 1%, from 0% to 5%, or from 0% to 10%. At block 503b, the method includes, in response to receiving the shock-extended signal, preventing the wheel speed sensor from communicating with the ABS module. As shown in FIG. 5D, a method 504 of executing an ABS override includes, at block 504a, receiving a shock-extended signal from a shock position sensor. The signal may indicate the shock is compressed from 0% to 1%, from 0% to 5%, or from 0% to 10%. At block 504b, the method includes, in response to receiving the shock-extended signal, sending a dummy wheel speed to the ABS module.

Figure 5E:
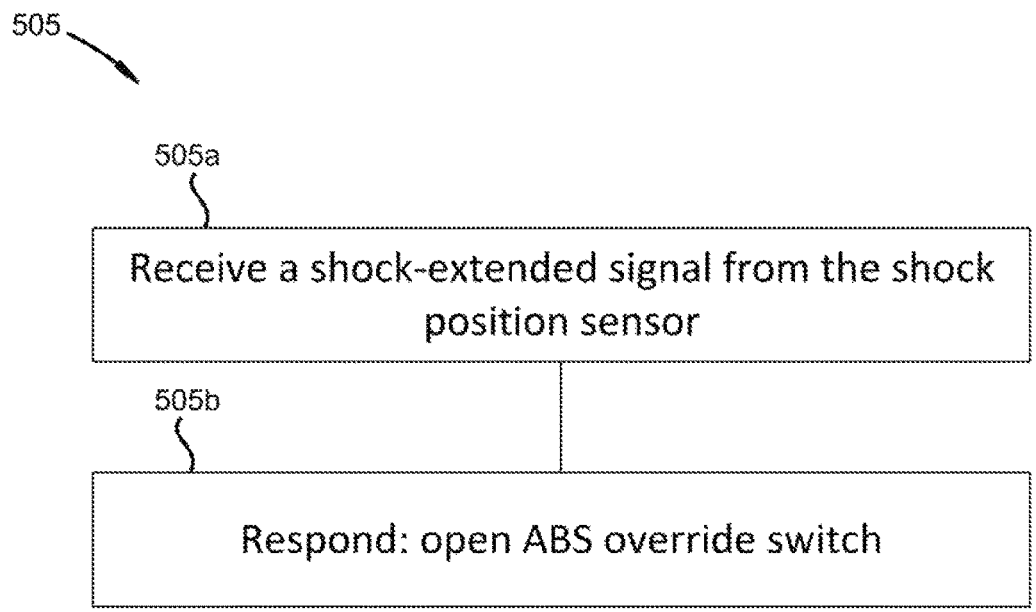
Figure 5F:
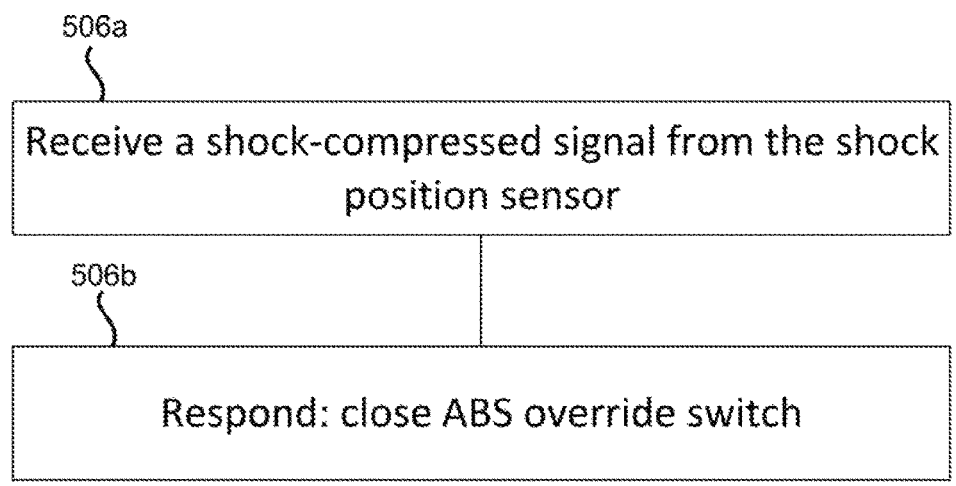

As shown in FIG. 5E, a method 505 of executing an ABS override includes, at block 505a, receiving a shock-extended signal from a shock position sensor. The signal may indicate the shock is compressed from 0% to 1%, from 0% to 5%, or from 0% to 10%. At block 505b, the method includes, in response to receiving the shock-extended signal, opening an ABS override switch. As shown in FIG. 5F, a method 506 of executing an ABS override includes, at block 506a, receiving a shock-compressed signal from a shock position sensor. The signal may indicate the shock is compressed from greater than 1% to 100%, from greater than 5% to 100%, or from greater than 10% to 100%. At block 506b, the method includes, in response to receiving the shock-compressed signal, closing the ABS override switch.

Figure 5G:
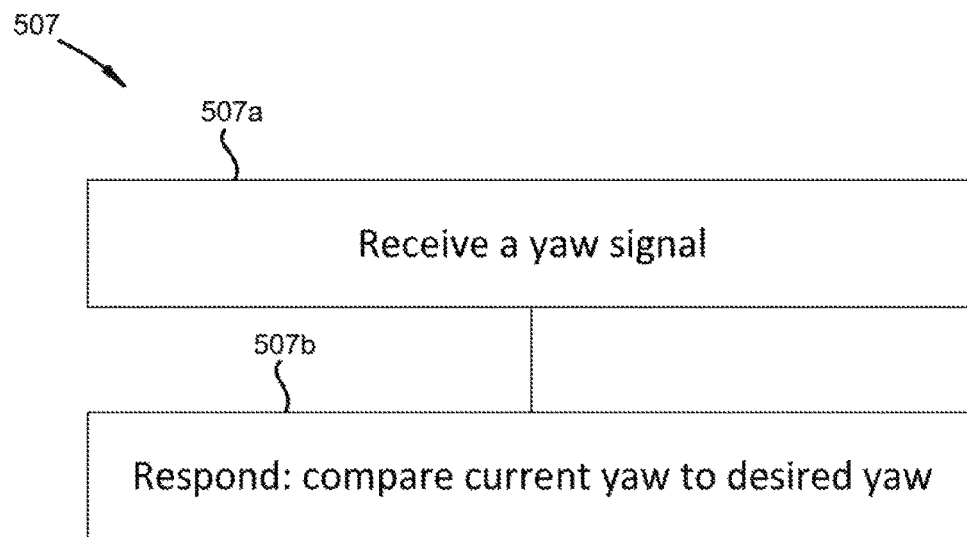
Figure 5H:
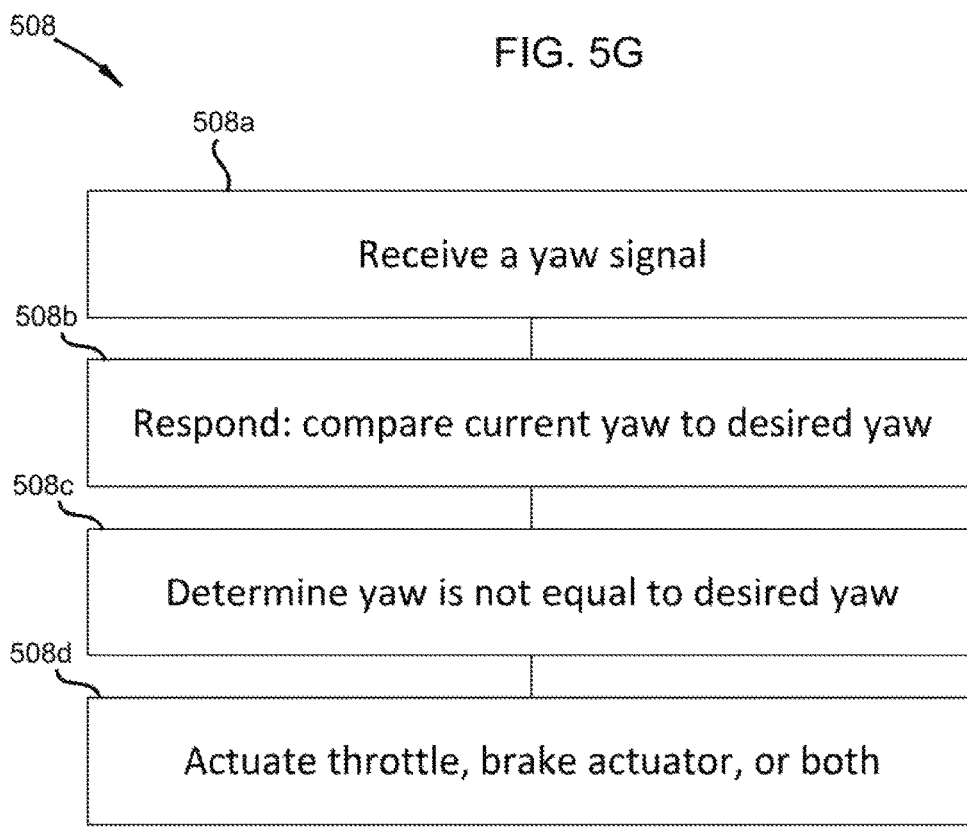

As shown in FIG. 5G, a method 507 of executing an ABS override includes, at block 507a, receiving a yaw signal from a yaw rate sensor indicating a yaw, a pitch, and a roll of a corresponding vehicle. At block 507b, the method includes comparing the current yaw, including the yaw, pitch and roll, to a desired yaw, including a desired yaw, pitch and roll. FIG. 5I-1 shows a further method of executing an ABS override using information gathered from the yaw rate sensor. The method 508 includes, at block 508a, receiving a yaw signal from a yaw rate sensor indicating a yaw, a pitch, and a roll of a corresponding vehicle. At block 508b, the method includes comparing the current yaw, including the yaw, pitch and roll, to a desired yaw, including a desired yaw, pitch and roll. At block 508c, the method includes determining the desired yaw is not equal to the current yaw. At block 508d, the method includes actuating the throttle, the brake actuator, or both, in response to determining the desired yaw is not equal to the current yaw.

Figure 6:
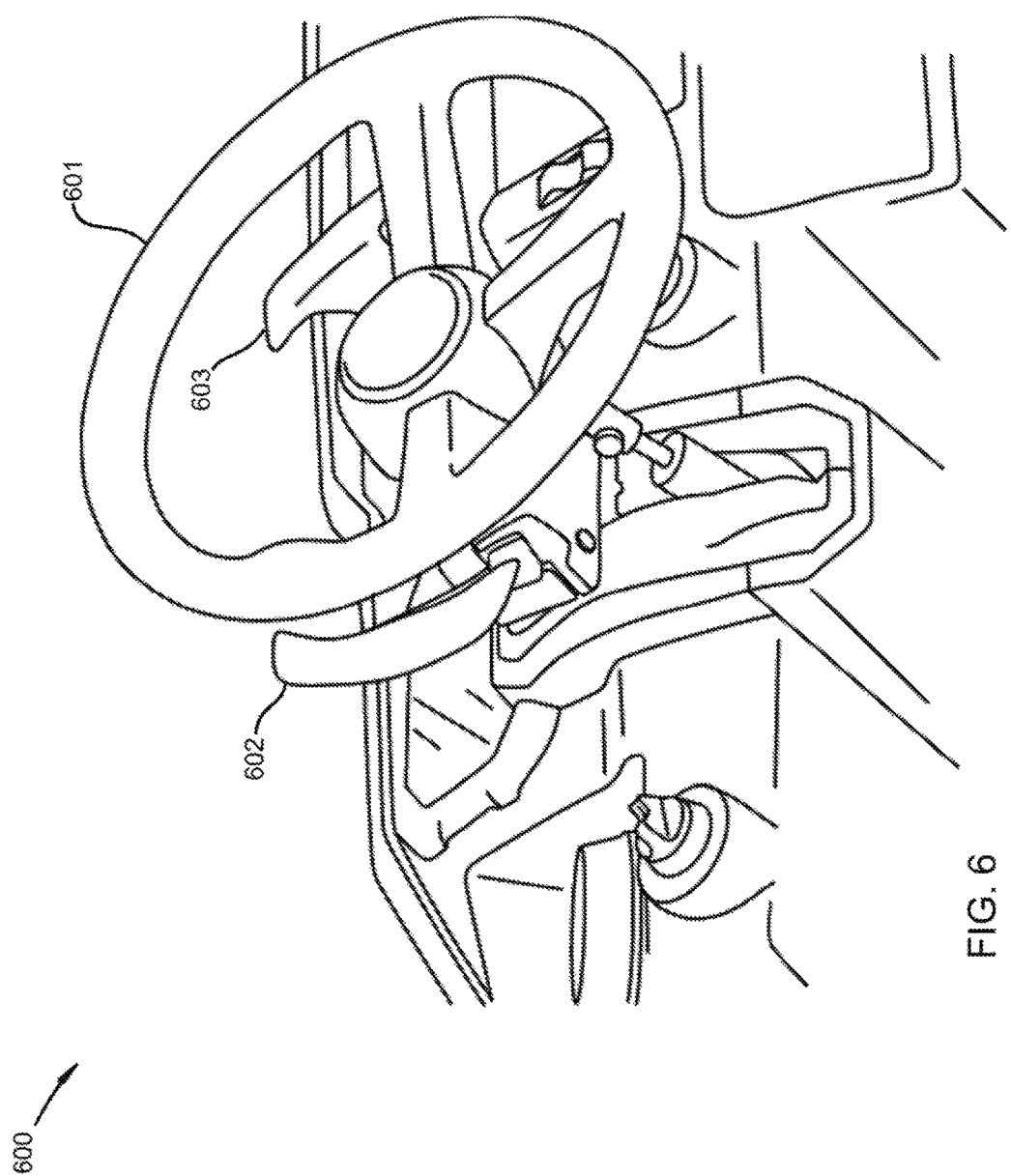
FIG. 6 depicts a zoomed-in interior view of an ORV.

FIG. 6 depicts a zoomed-in interior view of an ORV. The ORV 600 includes a steering wheel 601, a brake paddle 602, and a throttle paddle 603. The brake and throttle paddles may only be activated as shock position sensors indicate corresponding shocks are fully extended. A vehicle equipped with such a configuration may require operation with an understanding of how applying the brakes and throttle affects a vehicle in-air.

Figure 7:
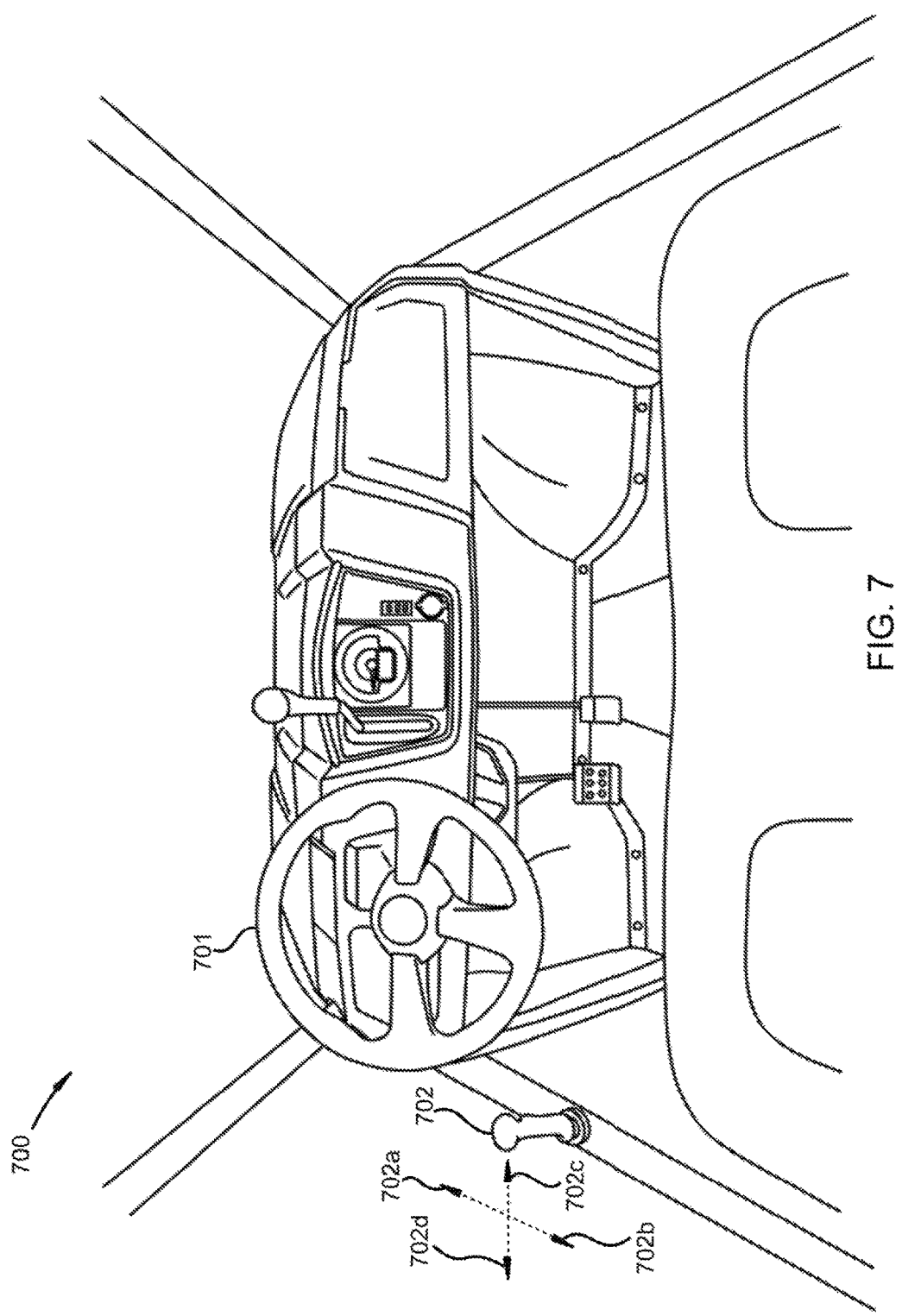
FIG. 7 depicts another interior view of an ORV.

FIG. 7 depicts another interior view of an ORV. The ORV 700 includes a steering wheel 701 and a multi-axis joystick 702. The joystick is used by a vehicle operator to indicate the direction the operator desires the yaw of the vehicle to change in-air. Pressing the joystick forward 702a indicates a pitch forward. Pressing the joystick back 702b indicates a pitch back. Pressing the joystick right 702c indicates a roll right. Pressing the joystick left 702d indicates a roll left. The ABS override module stores instructions that translate the desired direction of yaw change into actuations of the throttle and/or brakes of each individual wheel. A pitch forward may entail braking the front wheels, the back wheels, or all wheels. A pitch back may entail throttling the front wheels, the back wheels, or all wheels. A roll right may entail braking the right-side wheels. A roll left may entail braking the left-side wheels. Yawing the vehicle may entail braking one side of wheels and throttling the other side. A combination of pitch, roll, and yaw may entail braking or throttling a single wheel. A vehicle equipped with this configuration may therefore simplify changing direction in-air for an operator because the operator only needs to know which direction is desired.

Figure 8:
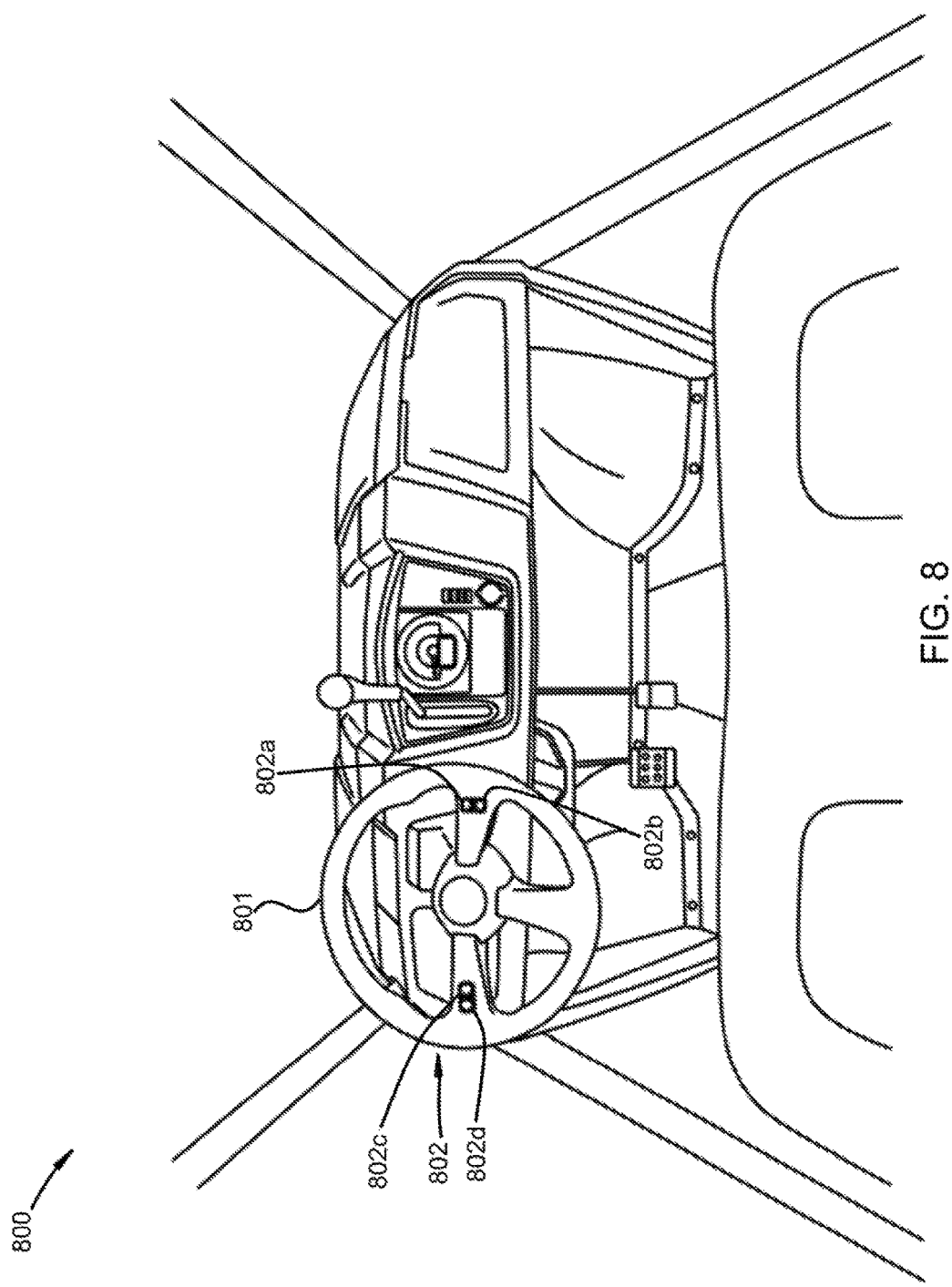
FIG. 8 depicts yet another interior view of an ORV.

FIG. 8 depicts yet another interior view of an ORV. The ORV 800 includes a steering wheel 801 and multi-axis buttons 802 embedded in the steering wheel. A button 802a indicates a desired forward pitch. A button 802b indicates a desired backward pitch. A button 802c indicates a desired right-side roll. A button 802d indicates a desired left-side roll. Similar to the embodiment depicted in FIG. 8, the present embodiment may beneficially allow a user to indicate a desired direction of travel, which may be translated by the ABS override module into appropriate corresponding actuation of the throttle and/or brake of each wheel or a collection of the wheels.

Figure 9:
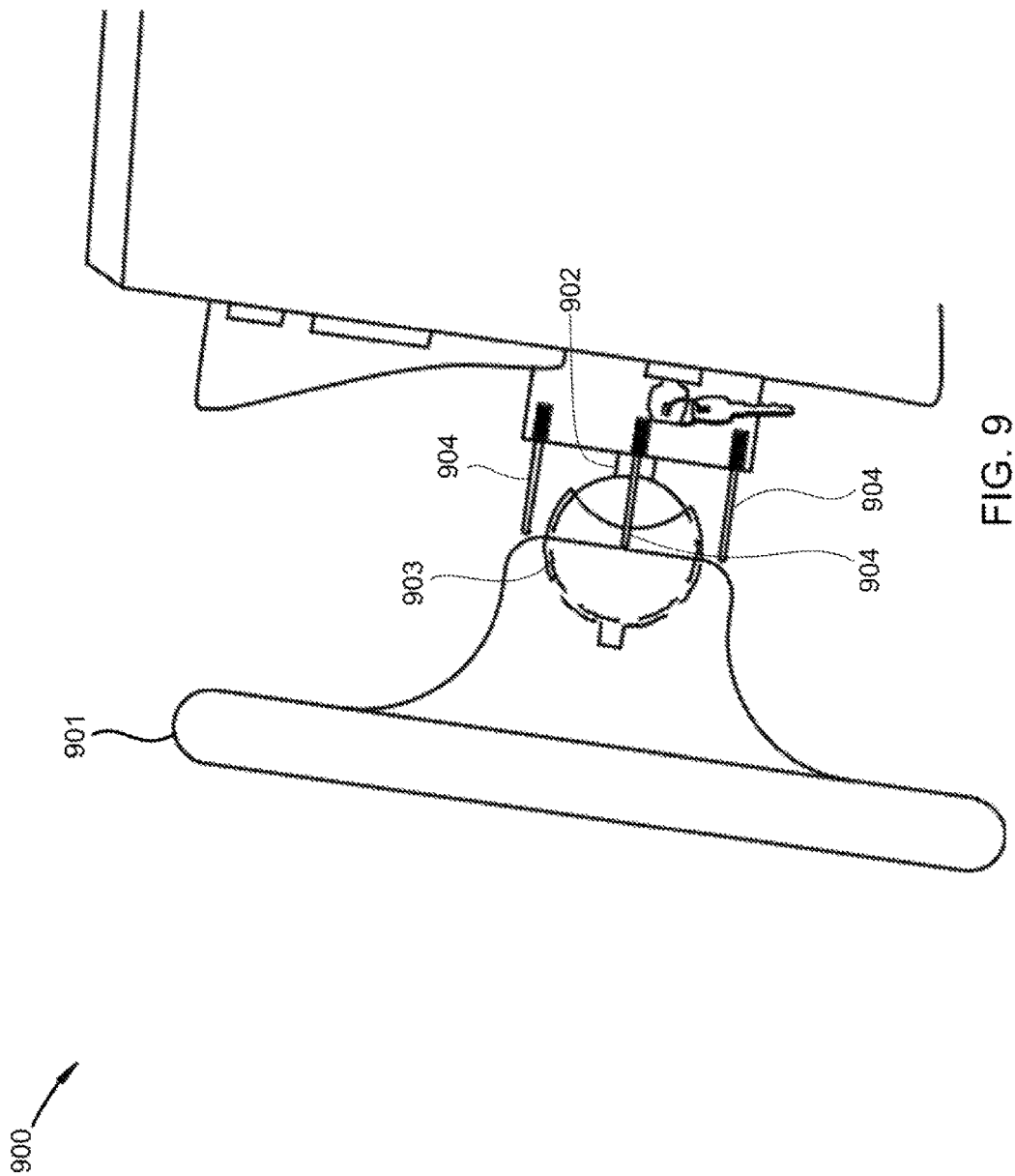
FIG. 9 depicts a side view of a steering column and dashboard of an ORV.

FIG. 9 depicts a side view of a steering column and dashboard of an ORV. The ORV 900 includes a steering wheel 901 mounted to a steering column 902 by a ball joint 903, and directional levers 904. The steering wheel pivots on the ball joint such that the steering wheel contacts the directional levers. The directional levers are electrically coupled to the ABS override module, and communicate a direction of yaw the operator desires for the vehicle in-air. The levers are only operational in the air, and ABS module translates the signals from the levers into actuations of the brakes and/or throttles.

Figure 10:
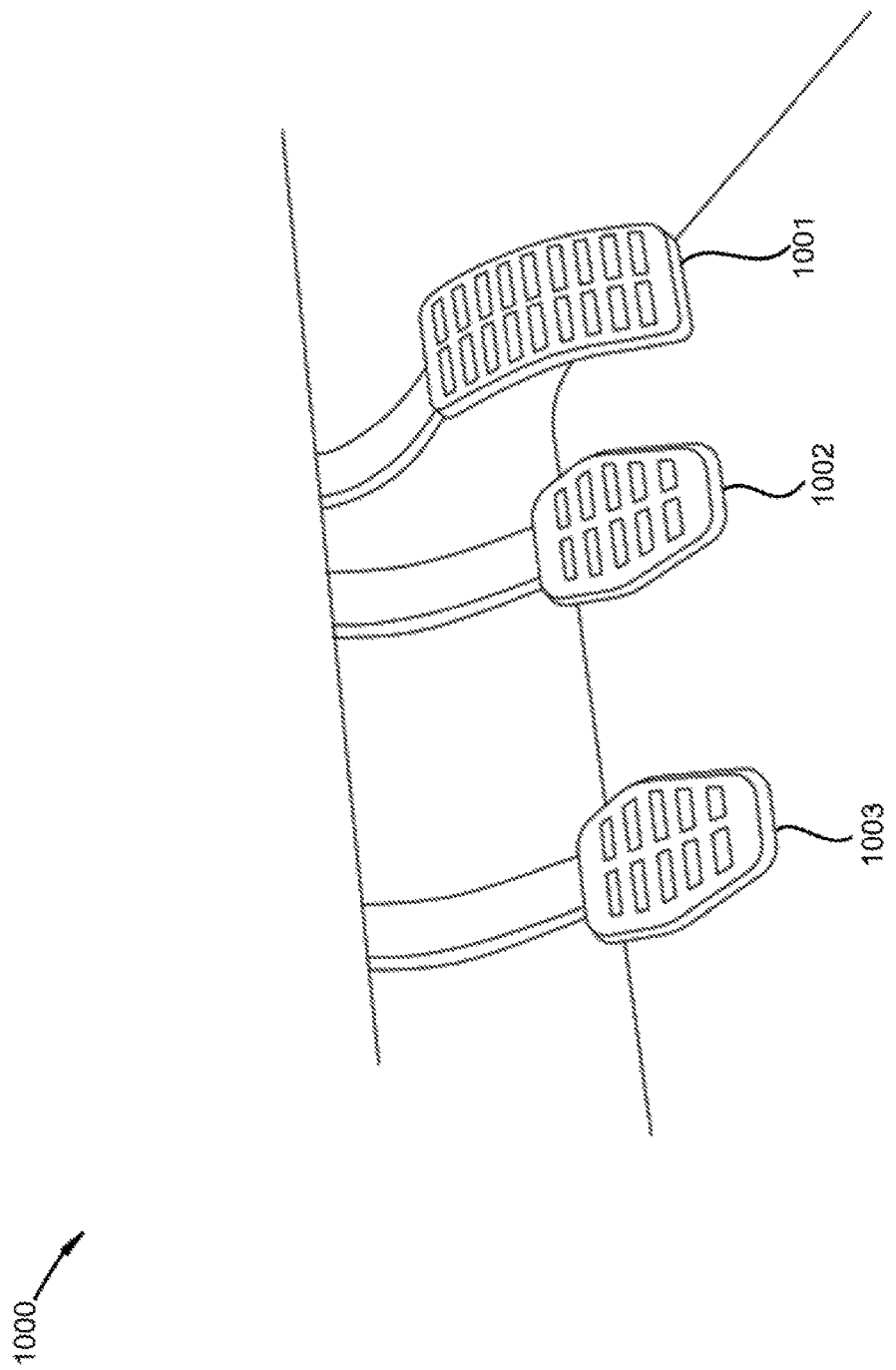
FIG. 10 depicts a zoomed-in view of foot pedals in an ORV.

FIG. 10 depicts a zoomed-in view of foot pedals in an ORV. The ORV 1000 includes throttle 1001, ground brake 1002, and in-air brake 1003. The in-air brake may only be operational as the vehicle is in the air. The in-air brake bypasses the ABS system, and is directly hydraulically connected to the brakes. Accordingly, the in-air brake may form an ABS override module. Operation of this system may require similar knowledge as is required in the system depicted in FIG. 6.

Figure 11A:
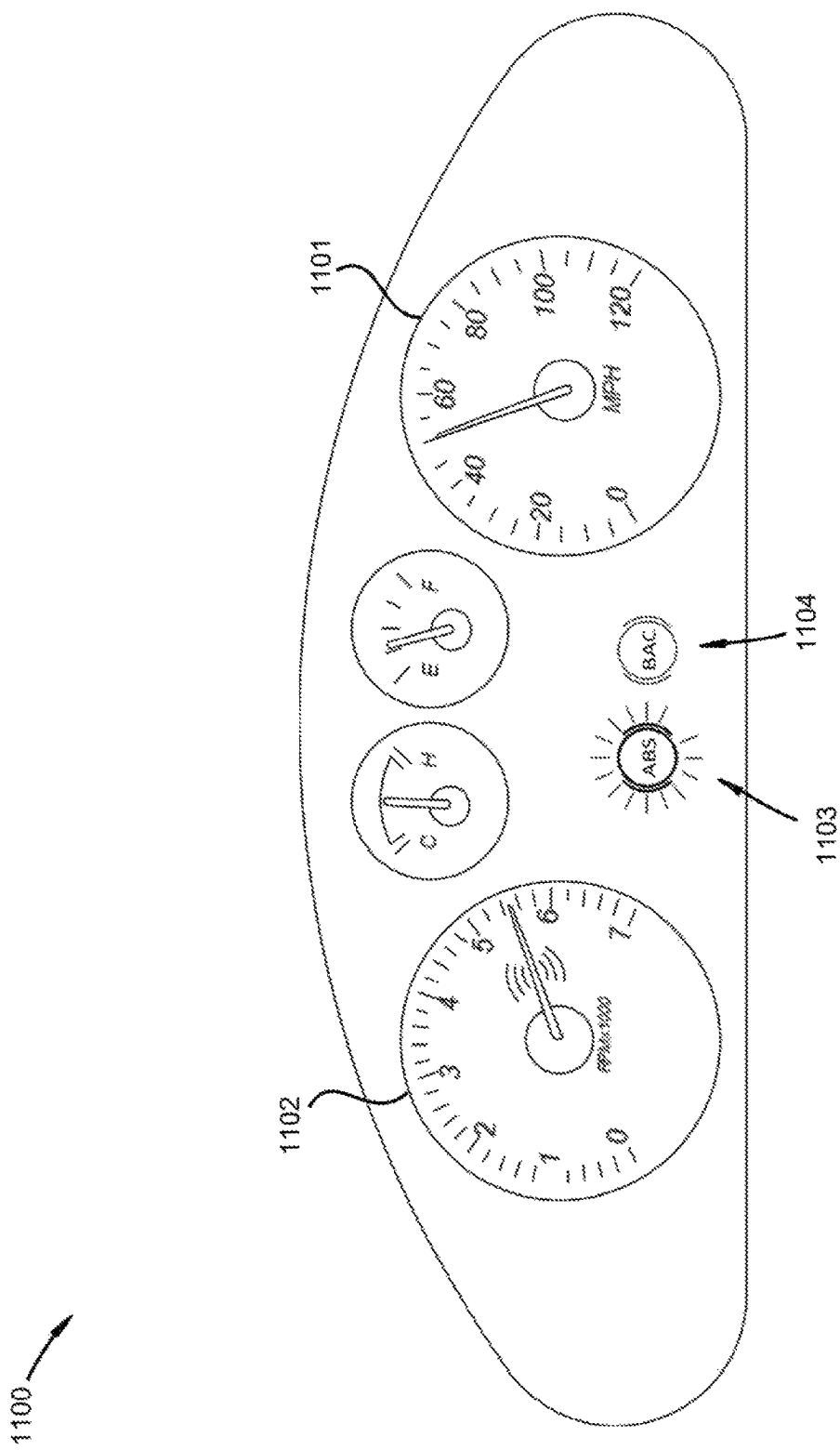
FIGS. 11A-B depict two views of a vehicle dashboard display.
Figure 11B:
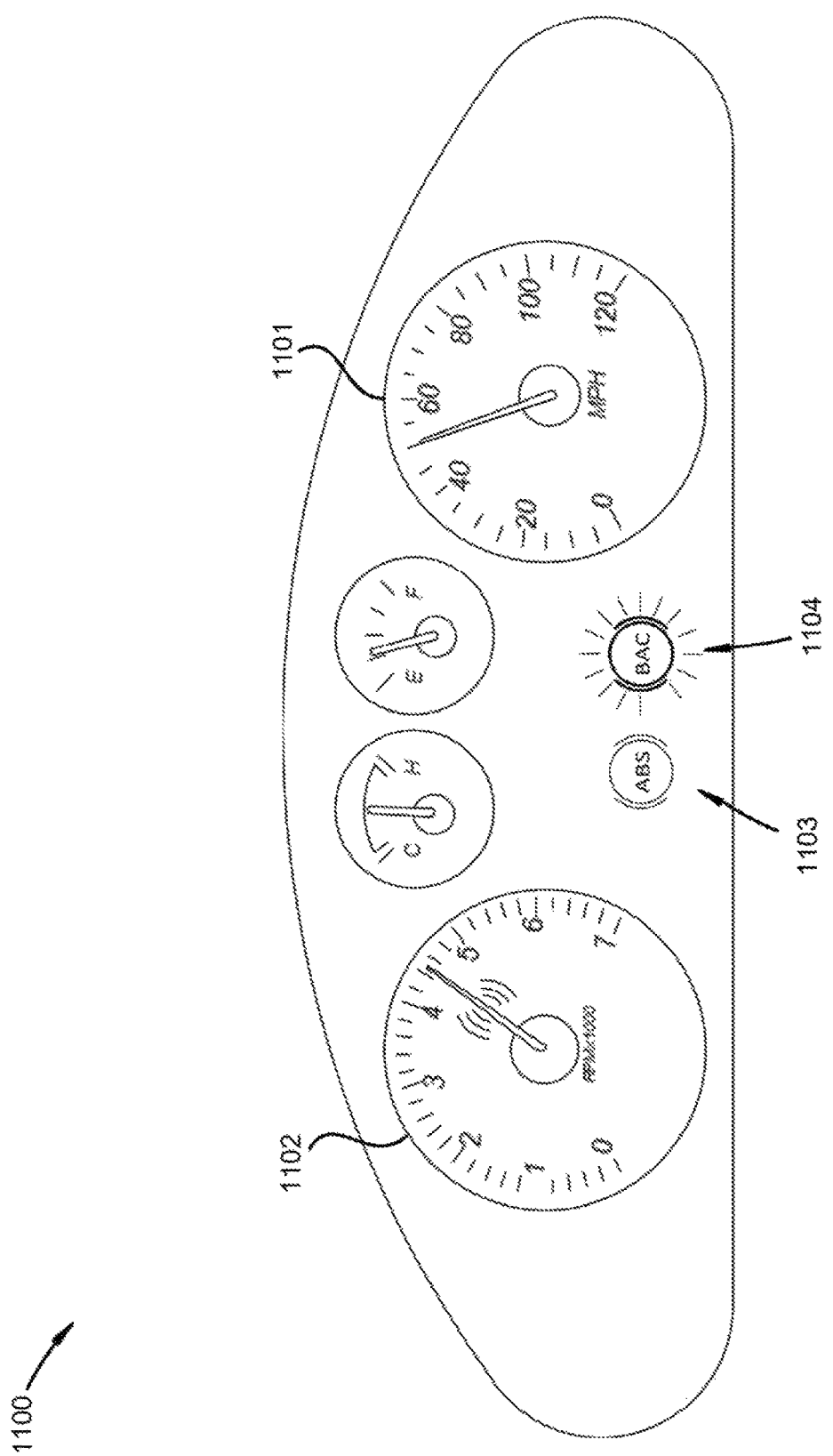

FIGS. 11A-B depict two views of a vehicle dashboard display. The display 1100 includes a speedometer 1101, a tachometer 1102, an ABS warning light 1103, and an in-air control light 1104. The ABS warning light indicates to a vehicle operator that the ABS system is malfunctioning. The in-air control light indicates to a vehicle operator that ABS override module has received a signal that the shocks are fully extended and has prevented the ABS module from operating. In FIG. 11A, the vehicle is on-ground and rev-limited by a rev limiter incorporated into the vehicle's ECU to 5500 rpm. The ABS warning light is on, indicating the ABS system is malfunctioning. In FIG. 11B, the vehicle is in-air and rev-limited by an in-air rev limiter incorporated in the vehicle's ECU to 4500 rmp. The in-air control light indicates the shocks are fully extended and the ABS override system is operating.

We claim:

1. A vehicle electronic control system, comprising:
    an Antilock Brake System (ABS) module electrically coupled to a brake actuator, wherein the ABS module comprises one or more of an electronic controller, programming stored on the electronic controller, a brake line, one or more valves, and one or more pumps;
    a shock position sensor that detects a percentage a corresponding shock is compressed; and
    an ABS override module electrically coupled to the shock position sensor and the ABS module, wherein the ABS override module comprises one or more of an electronic controller and programming stored on the electronic controller, wherein the ABS override module:
        receives a shock-extended signal from the shock position sensor indicating the shock is compressed from 0% to 10%;
        in response to receiving the shock-extended signal, sends a stop-ABS signal that prevents the ABS module from communicating with the brake actuator.

2. The vehicle electronic control system of claim 1, wherein the ABS override module further receives a shock-compressed signal from the shock position sensor indicating the shock is compressed from greater than 10% to 100%.

3. The vehicle electronic control system of claim 2, wherein the ABS override module further, in response to receiving the shock-compressed signal, allows the ABS module to communicate with the brake actuator.

4. The vehicle electronic control system of claim 1, further comprising a wheel speed sensor electrically coupled to one or more of the ABS module and the ABS override module.

5. The vehicle electronic control system of claim 4, wherein preventing the ABS module from communicating with the brake actuator comprises preventing the wheel speed sensor from communicating with the ABS module.

6. The vehicle electronic control system of claim 5, wherein preventing the ABS module from communicating with the brake actuator comprises sending a dummy wheel speed to the ABS module.

7. The vehicle electronic control system of claim 1, further comprising at least one switch electrically disposed between one or more of the ABS module, the ABS override module, and the brake actuator.

8. The vehicle electronic control system of claim 7, wherein preventing the ABS module from communicating with the brake actuator comprises opening the switch.

9. The vehicle electronic control system of claim 7, the vehicle further comprising a CAN bus and an ABS override bus, one or more of the switch, the ABS module, the brake actuator, and the ABS override module electrically coupled via one or more of the CAN bus and the ABS override bus.

10. The vehicle electronic control system of claim 1, comprising four shock position sensors corresponding to four shocks, wherein the ABS override module receives the shock-extended signal from one of the four shock position sensors, from two of the four shock position sensors, from three of the four shock position sensors, or from all four of the shock position sensors.

11. The vehicle electronic control system of claim 1, further comprising one or more of a visual and an audio indicator electrically coupled to the ABS override module, wherein the indicator indicates to a user the ABS override module is preventing the ABS module from communicating with the brake actuator.

12. The vehicle electronic control system of claim 1, further comprising an in-air rev limiter electrically coupled to the ABS override module, wherein the ABS override module further sends an in-air rev limit signal to the in-air rev limiter that activates the in-air rev limiter.

13. The vehicle electronic control system of claim 12, wherein the ABS override module sends the in-air rev limit signal in response to preventing the ABS module from communicating with the brake actuator.

14. The vehicle electronic control system of claim 12, further comprising an on-ground rev limiter that sets an on-ground rev limit, wherein the on-ground rev limiter limits rotation of the motor to a range from 4000 rpm to 5000 rpm.

15. The vehicle electronic control system of claim 14, wherein the in-air rev limit is lower than the on-ground rev limit by a range from 1000 rpm to 2000 rpm.

16. The vehicle electronic control system of claim 1, further comprising one or more of a multi-axis yaw sensor electrically coupled to the ABS override module, and a throttle electrically coupled to the ABS override module.

17. The vehicle electronic control system of claim 16, wherein the ABS override module receives a yaw signal from the yaw sensor indicating a current yaw of the vehicle about one or more perpendicular axes.

18. The vehicle electronic control system of claim 17, wherein the ABS override module, in response to receiving the yaw signal from the yaw sensor, compares the current yaw of the vehicle to a desired yaw of the vehicle.

19. The vehicle electronic control system of claim 18, wherein the ABS override module, in response to comparing the current yaw of the vehicle to a desired yaw of the vehicle, determines the current yaw is not equal to the desired yaw.

20. The vehicle electronic control system of claim 19, wherein the ABS override module, in response to determining the current yaw is not equal to the desired yaw, sends a signal that actuates the throttle, the brake actuator, or both.

* * * * *